June 8, 1948.        F. T. COOTE        2,442,750
HEAD MIRROR DEVICE
Filed Jan. 29, 1945
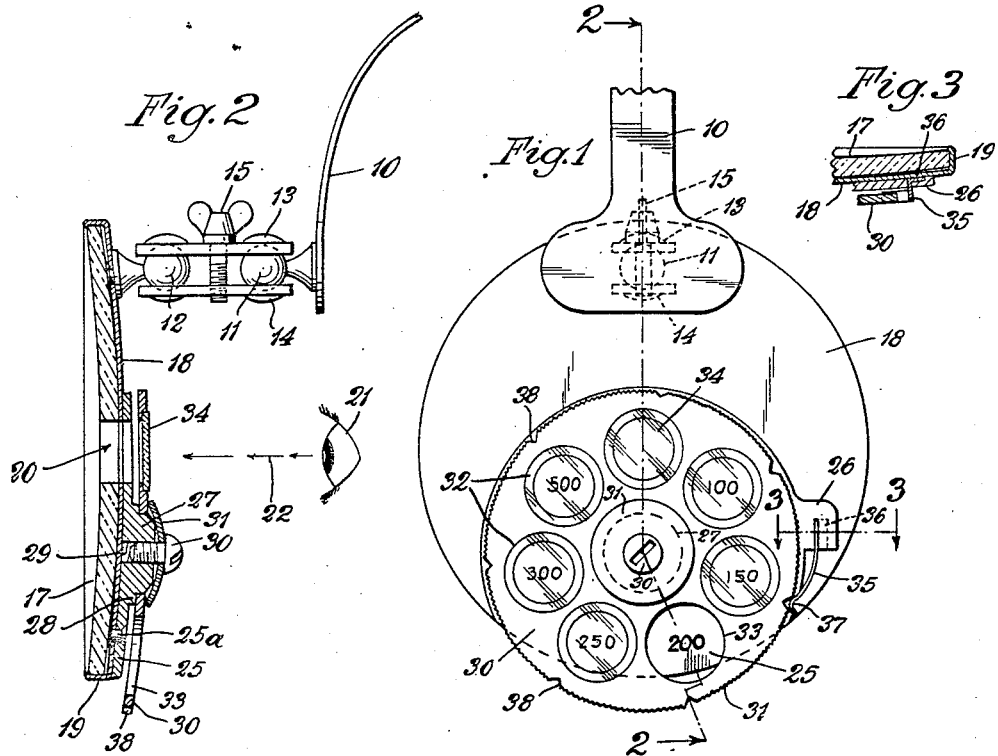
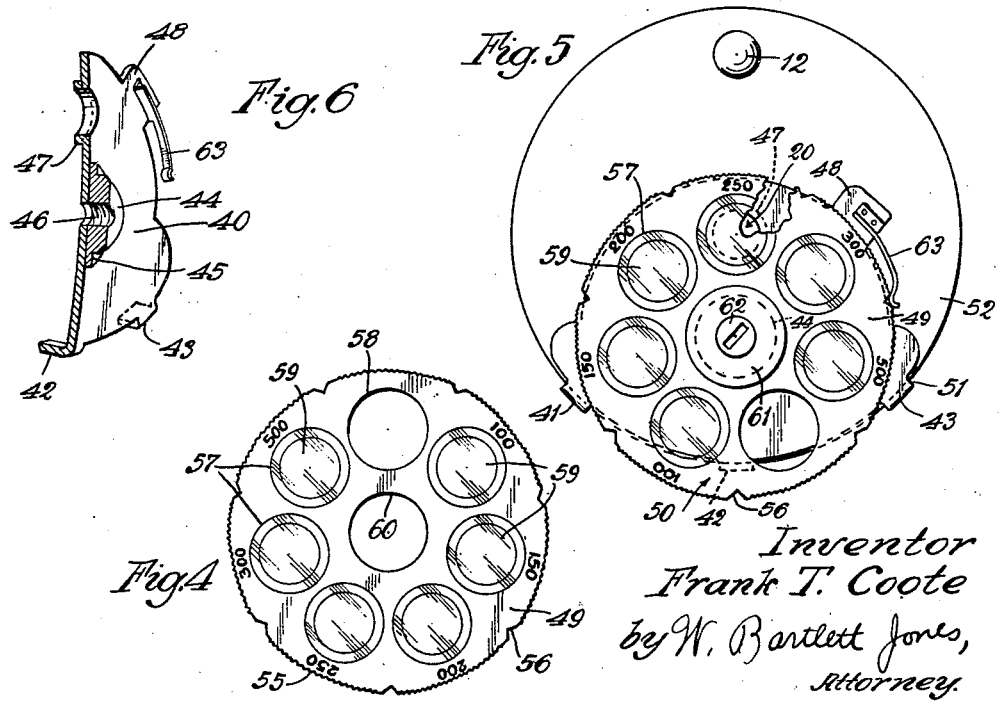
Inventor
Frank T. Coote
by W. Bartlett Jones,
Attorney.

Patented June 8, 1948

2,442,750

UNITED STATES PATENT OFFICE 2,442,750

HEAD MIRROR DEVICE

Frank T. Coote, Evanston, Ill.

Application January 29, 1945, Serial No. 575,003

5 Claims. (Cl. 128—21)

The present invention relates to viewing and illuminating mirrors, such as the head mirrors worn by various doctors, and characterized by a sight aperture through which the doctor views an objective field illuminated by the mirror. Commonly, such mirrors are slightly concave spherically or otherwise to focus light from a special source upon the objective field, and commonly in such cases the sight aperture is in the vicinity of the center of a circular reflective surface.

Such mirrors as heretofore commonly used, present disadvantages. Among these are use by those having defective vision requiring optical correction, and use by elderly or other people lacking accommodation of eye focus for distance. For example, when a doctor requires eyeglasses, the use of the ordinary head mirror with sight opening therein does not interfere with the eyeglasses, but the mere wearing of glasses, as during operating procedures, often leads to fogging of the lenses by condensation. The present invention provides a remedy for this condition.

Again, where the doctor has vision corrected by eyeglasses for say 10 inches, and needs different lenses for adequate vision at 20 inches, he has been hampered in wearing the usual head mirror, because he cannot in many circumstances stop to change his glasses. The present invention remedies this situation.

It is an object of the present invention to provide a sight-apertured mirror with a vision-modifying means readily movable into and out of functional registry with the sight-aperture.

It is a particular object of the invention to provide such a vision-modifying means as a disk-like member movable substantially edgewise into and out of functional registry with the sight-aperture.

It is a special object of the invention to provide a plurality of vision-modifying means selectively movable into and out of registry with the sight-aperture.

It is a particular object to provide a single member carrying a plurality of vision-modifying means, and to mount the same to a mirror in a manner to permit the wearer to move it easily to position a selected one of said plurality in and out of registry with the sight-aperture.

It is a particular object of the invention to provide apparatus into which one or more ophthalmic lenses or other vision-modifying means may be mounted to suit individual needs of one possessing the apparatus.

It is also an object to provide an attachment for conventional head mirrors into which one or more lenses or the like may be mounted for use or not.

Various other and ancillary objects and advantages of the invention will become apparent from the following description and explanation, given in connection with the accompanying drawings in which:

Fig. 1 is a rear view of a conventional head mirror modified by the present invention.

Fig. 2 is a vertical cross-section of Fig. 1 taken on the line 2—2 of Fig. 1.

Fig. 3 is a fragmentary cross-section taken on the line 3—3 of Fig. 1, showing details of mounting a detent.

Fig. 4 is a face view of a lens-carrying disk, as used in Fig. 1 or in Fig. 5.

Fig. 5 is a rear view of a conventional head mirror equipped with a detachable device embodying the present invention.

Fig. 6 is a perspective view of a removable foundation for the embodiment of the invention shown in Fig. 5.

The invention is of course not limited to the focusing head mirror used by doctors, but its preferred use is in this field, and hence the invention is illustrated by reference to the focusing head mirror having an opening through which the doctor's eye at the rear and non-reflecting face, views the field illuminated by the light focused by the mirror.

Also, the preferred use of the invention is to provide a mounting for a plurality of selectable ophthalmic lenses for the doctor who requires different optical correction for different distances. Thus, the doctor may move from one case to another requiring different working distances, without changing his eye-glasses, and needs only to make a simple movement of adjustment to bring into registry with the sight-aperture, a lens appropriate for the working distance. Thus, because the preferred vision-modifying means is an ophthalmic lens, the said means will be hereinafter referred to as, and illustrated by, a lens, with the understanding that it may be plain glass as an eye protection, polarizing material, intensity or color filters for special observations, or special magnification lenses.

Head mirrors as commonly worn stand forward of the eyes a sufficient distance to permit the wearer to use eyeglass frames. The present invention, in providing correction for the eyes, may thus permit dispensing with such frames. Although this would allow the present mountings for the mirror to be altered to move the mirror closer to the eye, this is undesired. The dispensing with eyeglass frames, and the retention of the usual spacing of the mirror from the eye has advantages: that the possibility of fogging the eyeglass lens is eliminated; that the desired one or more of functioning lenses is provided; and that the latter are not subjected to the danger of fogging.

Because of the limited space between the mirror and the head, and the desirability for it to be open to prevent fogging, the lenses of the present invention are mounted to conserve this space, and are hence mounted substantially flatwise as disk-like means, alongside a face or between faces and inside of, the body having the reflective surface. And in accordance with such mounting the lenses move into and out of functioning registry with a substantially edgewise motion.

All these and other features of construction are generally illustrated by the preferred form of the invention which is now described for the purpose of illustration.

While the following description includes reference to a plurality of lenses mounted in a carrier, it is to be understood that such lenses may be absent without departing from the invention, so long as there is present a movable carrier and mounting for such a lens or other vision modifying means. In its broadest aspect the invention includes the provision of apparatus without lenses or the like, which apparatus is adapted for carrying lenses or the like, as meets the needs or desires of the user of the apparatus.

In the drawings, the numeral 10 refers to a conventional head band, having ball-stud 11, connected to a similar ball-stud 12 (carried by the mirror) by two links 13 and 14 held together by a tightening wing-headed screw 15. The mirror has a concave silvered-back glass 17 held in a dished metal plate 18 of which the edge 19 forms a cup to receive the glass 17. A central sight aperture 20 is constituted by registering holes in the glass 17 and back plate 18. Plate 18 carries the stud 12.

The foregoing structure is representative of any apertured body, and of conventional head mirrors which as normally worn have a relation to the eye 21, as shown in Fig. 2, the aperture 20 being more distant from the eye than conventional eyeglass lenses. Arrow 22 marks the line of vision.

The present invention may be embodied originally as a mechanical counterpart to the mirror body 17—18, or it may be made so as to be affixed to it, or be removably attached to it. Thus, it may be sold as a device attachable to mirror bodies already in use.

In Figs. 1, 2 and 3, there is shown a structure in which the attachment of the present invention is more or less permanently a part of the mirror body. In Figs. 4, 5 and 6, a structure is shown which can be readily transferred from one mirror to another, or be readily removed when not needed.

There is provided a movable carrier for holding and moving a lens or the like into and out of registry with the sight aperture 20, and a mounting for said carrier, the constructions and arrangements preferably being such that the lens moves in a direction substantially edgewise of the aperture. Thus, the lens has a sliding movement generally parallel with the faces of the mirror-body, and little space is occupied by the new device. Preferably, a rotatable carrier is used, and also a plurality of lenses or the like, whereby a selection is available.

In Fig. 2 a suitable mounting or foundation is illustrated as a plate 25 or the like, as of molded plastic, which fits snugly against the back plate 18, preferably being cemented to it, or riveted to it as at 25a, or both. As shown it is generally circular with a peripheral ear 26 (Fig. 1), and the circle comprehends the area of the aperture 20, over which the plate 25 is likewise apertured. The circular contour overlaps the periphery of the mirror-body and this overlap is in effect cut away. A raised boss or bearing 27 is presented by the plate 25, and preferably the two are integral. The boss is circular and has at the base a peripheral shoulder or spacer ring 28 against which the movable carrier rests as it rotates on the boss 27 as a bearing. The boss has a central threaded opening 29 for a mounting screw 30. Between the head of the mounting screw 30 and the boss 27 is a dished plate or cap 31 which extends slightly beyond the boss periphery, thus providing an annular retaining ledge spaced away from the ring 28.

The preferred form of carrier is one rotatable on the boss 27 as a bearing. As shown, it is a circular disk 30 substantially of the same size as the circle of foundation plate 25. Hence, the disk 30 projects beyond the periphery of the mirror-body 17—18 and the projecting portion permits easy access of the fingers to its edge 31 (preferably knurled) for turning the disk. Also, the disk 30 thus comprehends the area of the sight aperture 20, and would cover it, except for the provision of a plurality of holes each registrable with the aperture 20. Seven such holes 32 are shown. Each of these holes provides a mounting area for locating in the hole, plain glass, optical lenses, magnifying lenses, color filters or other vision-modifying means. Preferably at least one hole 32 is open and free.

In Fig. 7, the hole designated 33 is free and open, as indicated. The others are illustrated with optical lenses therein. The lens 34 is in registry with the aperture 20. Within the open hole 33 can be read the legend "200" which is inscribed on the foundation plate 25. This signifies that the lens 34 at the aperture is a "200" lens. The other legends visible will likewise designate the registering lens when reading the legend through the free opening 33.

Means is provided for holding the carrier in selected positions of registry against ready displacement. A suitable means is carried by the ear 26. A leaf metal spring 35 is set into the ear with an angular extension 36 of it located under the ear in a recess (Fig. 3) for it. The end of the spring 35 has a V-shaped holder 37 which catches in like notches 38 in the periphery of the disk 30.

The embodiment shown in Figs. 4-6 is one which is attachable to and removable from a conventional head mirror. It is substantially identical in the parts and in their relationship, to the above described structure of Fig. 1, the primary variation being in the mounting or foundation. An attachable foundation 40 is shaped to fit the back of the mirror, being curved as shown in Fig. 4. It has three hooks 41, 42 and 43 which pass over the edge of the mirror, and a bearing boss 44 with shoulder 45 and screw hole 46, as in Fig. 1. A ring 47 over hole 48 (which registers with the sight opening in the mirror) is designed to be entered and fit snugly into the sight aperture in the mirror back, to cooperate in holding the device. An ear 48 is provided for mounting a detent. The parts are so proportioned in dimensions that the disk-carrier 49 of Fig. 4 projects at 50 over the edge 51 of mirror-back 52.

The edge 55 of disk 49 is knurled to facilitate turning, and is notched at 56 for each registry position of the holes 57, of which hole 58 is shown open, the others having lenses 59 mounted therein. Fig. 4 shows the disk of Fig. 5 removed, to indicate its bearing hole 60, which fits over bearing boss 44. A cover plate 61 and screw 62 hold the disk 49 in place. A spring detent 63, carried on ear 48 (as in Fig. 1) enters notches 56.

In practice the disks 30 or 49, which are substantially identical, may be sold with open holes, for the receipt of any lens or other element desired by the user of the mirror. With the majority of users, one or more of the lenses shown, of the list: 100, 150, 200, 250, 300, and 500, will be useful, and may be provided by the manufacturer already set into the disk. Where any one is not needed, it may be replaced by some special one, if desired. Any optician may supply and mount special lenses. Also, a special disk may be substituted, for the one illustrated, or superimposed over the one illustrated.

The invention, therefore, has several aspects. It is the combination of mirror with one or more lenses or the like; and it is the attachable lens-carrier with or without lenses or the like.

The invention is not limited to the exemplary embodiments herein illustrated for explaining the nature of the invention, and it is to be understood that numerous departures and modifications are contemplated as falling within the scope of the appended claims.

I claim:

1. A mirror comprising a plate-like member having on one face a reflective area for illuminating a field to be viewed and having a viewing aperture through the member for viewing the field from the other face of the member, a rotatable carrier pivoted with respect to and movable over the said other face of the member, and a plurality of vision-modifying means mounted in said carrier for movement of each such means into and out of registry with said aperture, and holding means to fix the carrier against ready displacement from a position of registry.

2. A mirror comprising a plate-like member having on one face a reflective area for illuminating a field to be viewed and having a viewing aperture through the member for viewing the field from the other face of the member, a rotatable carrier pivoted with respect to and movable over the said other face of the member and adapted for mounting therein a plurality of vision-modifying means for movement by said carrier of each such means into and out of registry with said aperture, and holding means to fix the carrier against ready displacement from a position of registry.

3. A modifying device for a mirror having a sight aperture therein, comprising in combination a rotatable carrier for holding fixed therein a plurality of vision-modifying means in circular arrangement about the axis of rotation and in position for each to be placed in registry with said sight aperture, means for mounting said carrier in rotatable position on said mirror to move each of said vision-modifying means substantially edgewise of the aperture into and out of functional registry with the aperture, and holding means adapted to arrest adjusting motion of the carrier at each position of registry and to hold the carrier in arrested position.

4. A modifying device for a mirror having a sight aperture therein, comprising in combination a movable carrier for holding therein a plurality of vision-modifying means in an arrangement to position each in registry with said aperture upon some motion of the carrier, means for mounting said carrier movably on said mirror to move each of said vision-modifying means substantially edgewise of the aperture into and out of functional registry with the aperture, and holding means adapted to arrest adjusting motion of the carrier at each position of registry and to hold the carrier in arrested position.

5. A head mirror of the type worn by physicians immediately in front of one eye and of the type having a sight aperture therethrough, comprising in combination, an apertured member having a front reflective face and a rear face, a rotatable circular disk-like carrier adapted for holding a plurality of vision-modifying means in circular arrangement about the axis of rotation, means for mounting said carrier on said rear face for rotation to bring any one of said carried vision-modifying means into registry with said aperture, said carrier having its periphery extending beyond the edge of said member and closely adjacent thereto whereby the edge of said member may function as a guide to a finger leading to said carrier for movement of the carrier, said carrier being suitably provided with a holding recess for each registering position of the carrier, and detent means operating on the carrier and arranged to enter each recess to arrest selecting motion of the carrier at a position of registry and to hold the carrier in arrested position.

FRANK T. COOTE.

REFERENCES CITED

The following references are of record in the file of this patent:

UNITED STATES PATENTS

| Number | Name | Date |
| --- | --- | --- |
| 311,185 | Hardy | Jan. 27, 1885 |
| 941,581 | Martin | Nov. 30, 1909 |
| 1,537,922 | Maxwell | May 12, 1925 |
| 1,873,356 | Stimson et al. | Aug. 23, 1932 |
| 1,914,874 | Walton | June 20, 1933 |
| 2,321,915 | Higley | June 15, 1943 |